United States Patent
Akiyama

(10) Patent No.: US 6,807,601 B2
(45) Date of Patent: *Oct. 19, 2004

(54) DATA PROCESSING DEVICE HAVING A PLURALITY OF STATE-MACHINE PARTS

(75) Inventor: Kazuhito Akiyama, Osaka (JP)

(73) Assignee: Ricoh Company, LTD, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 10/246,212

(22) Filed: Sep. 18, 2002

(65) Prior Publication Data

US 2003/0018844 A1 Jan. 23, 2003

Related U.S. Application Data

(63) Continuation of application No. 09/304,513, filed on May 3, 1999.

(30) Foreign Application Priority Data

May 7, 1998 (JP) ............................ 10-124497

(51) Int. Cl.[7] .............................................. G06F 13/14
(52) U.S. Cl. ......................................... 710/315; 710/4
(58) Field of Search ............................... 710/305–315, 710/62–74, 3–7

(56) References Cited

U.S. PATENT DOCUMENTS 5,265,252 A * 11/1993 Rawson et al. ............. 709/326
5,577,213 A * 11/1996 Avery et al. ................. 710/100
5,581,727 A * 12/1996 Collins et al. ............... 711/135
5,680,592 A * 10/1997 Priem ........................... 703/37
5,805,842 A * 9/1998 Nagaraj et al. ............. 710/313
5,913,062 A * 6/1999 Vrvilo et al. ................ 709/321
5,978,858 A * 11/1999 Bonola et al. .................. 710/1
6,134,619 A * 10/2000 Futral et al. ................. 710/112
6,157,976 A * 12/2000 Tien et al. ................... 710/314
6,233,641 B1 * 5/2001 Graham et al. ............. 710/316
6,256,692 B1 * 7/2001 Yoda et al. .................. 710/104
6,373,582 B1 * 4/2002 Asai ........................... 358/1.13
6,442,672 B1 * 8/2002 Ganapathy ................... 712/201

FOREIGN PATENT DOCUMENTS

JP 7334564 12/1995

* cited by examiner

Primary Examiner—Sumati Lefkowitz
(74) Attorney, Agent, or Firm—Cooper & Dunham LLP

(57) ABSTRACT

In a data processing device connectable to a bus, a plurality of function parts can be operated at the same time so that data transfer between buses or within the device can be efficiently performed. Each of the function parts provides a different function with respect to a signal input through the bus. A plurality of state-machine parts are connected to the respective function units. Each of the state-machine parts is operable independently.

6 Claims, 4 Drawing Sheets

DATA PROCESSING DEVICE HAVING A PLURALITY OF STATE-MACHINE PARTS

This is a continuation divisional of application Ser. No. 09/304,513 filed May 3, 1999.

BACKGROUND OF THE INVENTION

1. Field of the Invention

The present invention generally relates to a data processing device and, more particularly, to a data processing device which has a plurality of function parts.

2. Description of the Related Art

A LAN card or a modem card is known as a card device which is attached to a personal computer so as to provide an additional function to the personal computer. The LAN card provides a LAN function to the personal computer. The modem card provides a modem function to the personal computer. Recently, a multi-function card device (PC card) which can provide a plurality of functions has become available on the market. The multi-function card device provides a plurality of functions by having a plurality of function parts each of which provides one of the functions. The multi-function card device includes a single state-machine part and an interface which connects the state machine to a bus provided in the personal computer.

The state-machine part manages each of the function parts in accordance with instruction provided through the bus. Japanese Laid-Open Patent Application No.7-334564 teaches such a state-machine part. However, the state-machine part cannot manage a plurality of function parts at the same time. That is, if an instruction with respect to one of the function parts is input when the state-machine part is being operated for a different one of the function parts, the state-machine part cannot accept the instruction.

The multi-function device may be provided with a bridge circuit which connects a plurality of buses having different specifications. That is, for example, the bridge circuit connects a Peripheral Component Interconnect (PCI) bus to a first card bus and a second card bus. In this case, the multi-function device (the bridge circuit) is provided with a single state-machine part which manages a first function part connected to the first card bus and a second function part connected to the second function bus. This state-machine part manages only one of the first function part and the second function part at a time. That is, the state-machine part cannot manage both the first function part and the second function part at the same time.

FIG. 1 is a time chart for explaining a data transferring operation performed by the above-mentioned conventional multi-function device. In the data transferring operation, data is transferred from a PCI bus to a card bus in accordance with a delayed transaction method.

In FIG. 1, PCLK is a clock signal, and PAD is data exchanged between the PCI bus side and the multi-function device. FRAME# represents a state of a signal line for notifying the multi-function device of the reception of address data (instruction) through the PCI bus. That is, when the signal line FRAME# is at a low level, this indicates that the address data is received through the PCI bus. IRDY# represents a state of a signal line for notifying the multi-function device of the completion of preparation for exchanging data with the PCI bus side from which the address data (instruction) is input. Additionally, DEVSEL# represents a state of a signal line which notifies the PCI bus side of the result of selection of one of the function parts corresponding to the address data (instruction). If the data to be transferred to the PCI bus side has not been prepared when the result of selection of the function part is notified, a signal line TRDY# is at a high level and a signal line STOP# is at a low level.

When the address data (A1) is input first time from the PCI bus, the data to be transferred to the PCI bus side is not prepared. Thereby, the signal line TRDY# is at the high level and the signal line STOP# is at the low level. At this time, preparation for the data (D1) to be transferred to the PCI bus is started. The preparation for the data (D1) by the function part is managed by the state-machine part. Since the operation of the state-machine part is solely directed to the management of the function part corresponding to the address data (A1), the state-machine part cannot manage any other function parts. Accordingly, if another address data (A2) is input from the PCI bus side, the address data (A2) cannot be accepted.

When the second address data (A1) is input after the preparation of the data (D1) to be transferred to the PCI bus side is completed, the signal line TRDY# is changed to the low level while the signal line STOP# is maintained to be at the high level. Thus, the data (D1) is transferred to the PCI bus side. Simultaneously, the state-machine part is released from the operation for managing the function part. Thereafter, if the address data (A2) is input again, the address data (A2) is accepted at this time, and the preparation for the data corresponding to the address data (A2) is started.

As mentioned above, the address data (A2) is not accepted if the address data (A2) is input when the state-machine part is being operated for managing one of the function parts. The operation for the address data (A2) can be performed when the address data (A2) is input after the preparation for the data (D1) corresponding to the address data (A1) is completed. Accordingly, there is a problem in that a plurality of function parts cannot be operated at the same time, and data transfer between the buses or within the multi-function device cannot be efficiently performed.

SUMMARY OF THE INVENTION

It is a general object of the present invention to provide an improved and useful data processing device in which the above-mentioned problems are eliminated.

A more specific object of the present invention is to provide a data processing device in which a plurality of function parts can be operated at the same time so that data transfer between buses or within the device can be efficiently performed.

In order to achieve the above-mentioned objects, there is provided according to the present invention a data processing device adapted to be connected to a first bus, the data processing device comprising:

a plurality of function parts each of which provides a different function with respect to a signal input through the first bus; and a plurality of state-machine parts connected to a respective one of the function units, each of the state-machine parts being operable independently.

According to the present invention, each of the state-machine parts is operable independently irrespective of whether other state-machine parts are being operated. That is, the plurality of state-machine parts can be operated at the same time. Thereby, the plurality of function devices managed by the respective state-machine parts can be operated at the same time. Thus, the first bus is prevented from being occupied by a single function part, which results in data transfer being efficiently performed.

Other objects, features and advantages of the present invention will become more apparent from the following detailed description when read in conjunction with the accompanying drawings.

DETAILED DESCRIPTION OF THE PREFERRED EMBODIMENT

Figure 1:
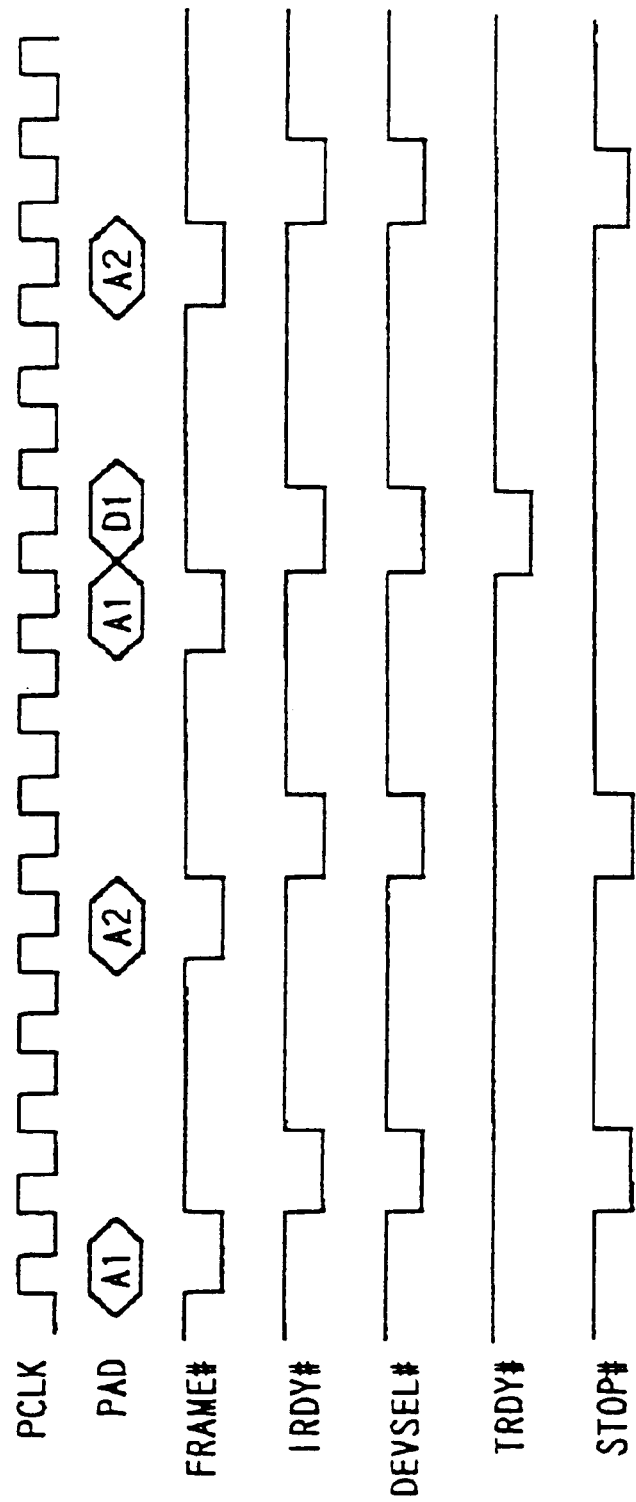
FIG. 1 is a time chart for explaining a data transferring operation performed by a conventional multi-function device.
Figure 2:
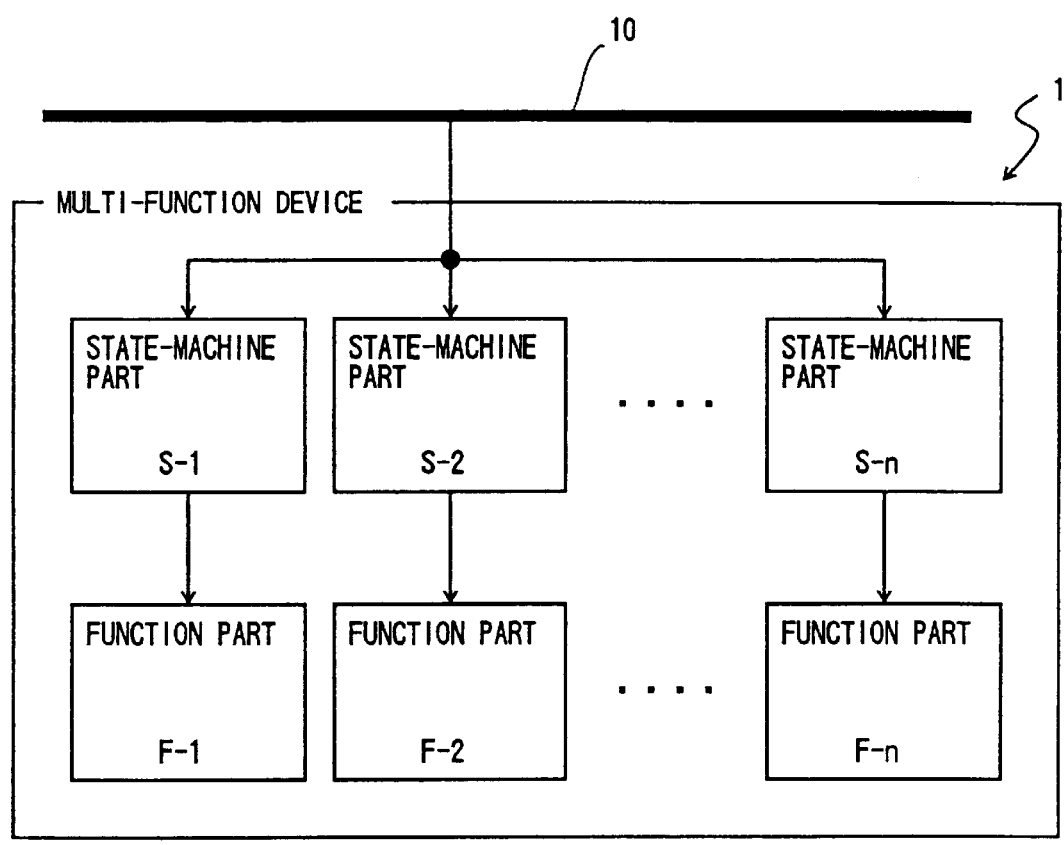
FIG. 2 is a block diagram of a multi-function device according to a first embodiment of the present invention.

A description will now be given, with reference to FIG. 2, of a first embodiment of the present invention. FIG. 2 is a block diagram of a multi-function device according to the first embodiment of the present invention.

The multi-function device 1 shown in FIG. 2 is provided as a PC card. The multi-function device 1 comprises a plurality of function parts F-1, F-2, . . . , F-n and a plurality of state-machine parts S-1, S-2, . . . , S-n. The state-machine part S-n is provided for exclusively managing the function part F-n. That is, the state-machine part S-1 manages the operation of the function part F-1, and the state-machine part S-2 manages the operation of the function part F-2, and so on. Each of the function part provides a different function. For example, the function part F-1 provides a modem function, the function part F-2 provides a local area network (LAN) function and the function part F-n provides a small computer system interface (SCSI) function. Each of the state-machine parts S-1, S-2, . . . , S-n can be operated independently. Additionally, each of the state-machine parts S-1, S-2, . . . , S-n is provided with an interface part (not shown in the figure).

The multi-function device 1 is connected to a PCI bus 10 provided in a personal computer to which the multi-function device is attached. A line connecting the multi-function device 1 to the PCI bus 10 may comprise 32 single-bit lines which corresponds to a capacity for transmitting only one instruction at a time.

According the structure of the multi-function device 1 in which a plurality of state-machine parts S-1, S-2, . . . , S-n are provided, a plurality of function parts F-1, F-2, . . . , F-n can be operated at the same time. That is, for example, even if address data (instruction) with respect to the function part F-2 is input when the state-machine part S-1 is managing the function part F-1 to prepare data, the address data for the function part F-2 is input and processed by the state-machine part S-2 which is independently provided from the state-machine part S-1 being in operation. Accordingly, the preparation of data corresponding to the address data for the function part F-2 can be simultaneously performed with the preparation of data corresponding to the address data for the function part F-1. That is, a plurality of function parts can be simultaneously operated so that the bus is prevented from being occupied by a single function part which results in data transfer being efficiently performed. It should be noted that a conventional state-machine part can be used as each of the state-machine parts S-1, S-2, . . . , S-n.

Figure 3:
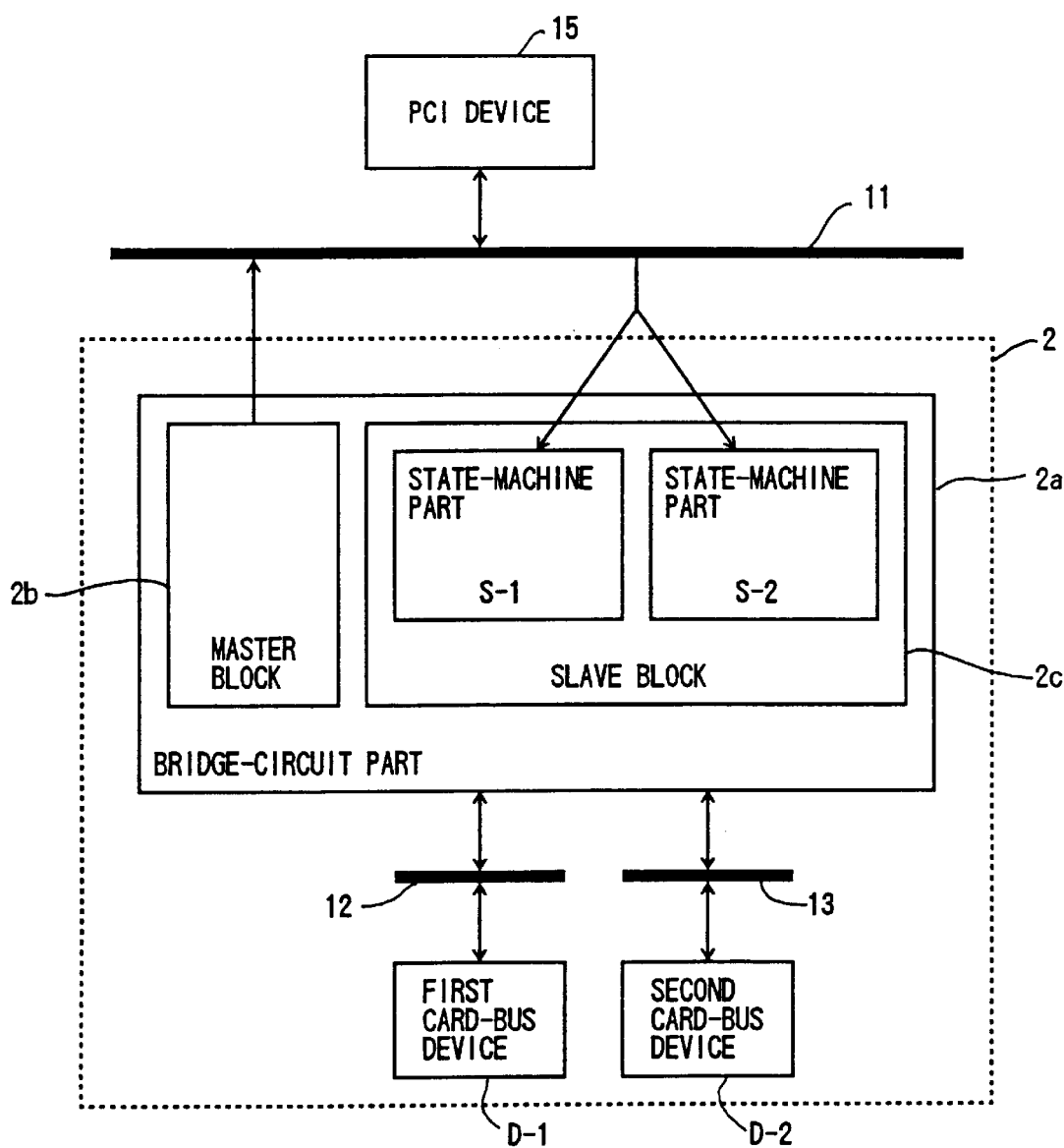
FIG. 3 is a block diagram of a multi-function device according to a second embodiment of the present invention.

A description will now be given, with reference to FIG. 3, of a second embodiment of the present invention. FIG. 3 is a block diagram of a multi-function device 2 according to the second embodiment of the present invention. The multi-function device 2 includes a bridge-circuit part 2a which interconnects a plurality of buses having different specifications. Specifically, the bridge-circuit part 2a interconnects a PCI bus 11 to each of a first card bus 12 and a second card bus 13. A first card-bus device D-1 is connected to the first card bus 12, and a second card-bus device D-2 is connected to the second card bus 13. Each of the first card-bus device D-1 and the second card-bus device D-2 serves as a function part.

The bridge-circuit part 2a comprises a master block 2b and a slave block 2c. The slave block 2c includes a state-machine part s-1 and a state-machine part s-2. The state machine-part s-1 manages the first card device D-1, and the state-machine part s-2 manages the second card-bus device D-2. Each of the state-machine parts s-1 and s-2 can be operated independently. The master block 2b sends a signal received from the first card-bus device D-1 or the second card-bus device D-2 to the PCI bus 11.

A description will now be given of a data transferring operation for transferring data from a PCI device 15 connected to the PCI bus 11 to the first card bus 12. The data output from the PCI device 15 is input to each of the first and second state-machine parts s-1 and s-2 via the PCI bus 11. Each of the first and second state-machine parts s-1 and s-2 decodes address data included in the input data so as to determine whether the address data corresponds to the first card bus 12 or the second card bus 13. When the state-machine part s-1 recognizes that the address data corresponds to the first card bus 12, the state-machine part s-1 continues the operation so as to send the input data to the first card bus 12. In this case, the state machine part s-2 recognizes that the address data does not corresponds to the second card bus 13. Accordingly, the state-machine part s-2 ends its operation. It should be noted that a data transferring operation for transferring data from the first card bus 12 or the second card bus 13 can be performed in a manner similar to the above-mentioned data transferring operation.

Figure 4:
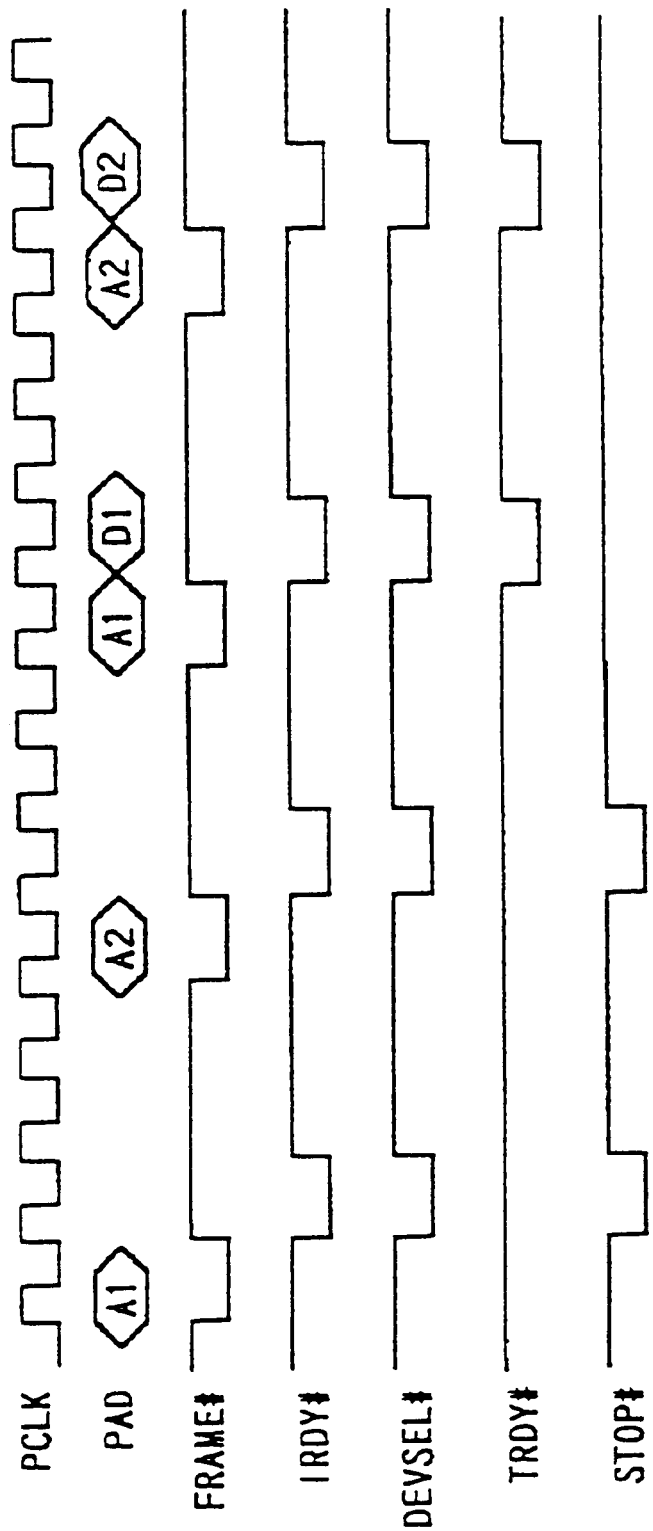
FIG. 4 is a time chart for explaining a data transferring operation performed by the multi-function device shown in FIG. 3.

A description will now be given, with reference to FIG. 4, of the data transferring operation performed by the multi-function device 2 shown in FIG. 3. FIG. 4 is a time chart for explaining the data transferring operation performed by the multi-function device 2. In the data transferring operation, data is transferred from the PCI bus 11 to the first card bus 12 or the second card bus 13 in accordance with a delayed transaction method.

In FIG. 4, PCLK is a clock signal, and PAD represents data exchanged between the PCI device 15 and the multi-function device 2. FRAME# represents a state of a signal line for notifying the multi-function device of the reception of address data (instruction) through the PCI bus 11. That is, when the signal line FRAME# is at a low level, this indicates that the address data is received through the PCI bus 11. IRDY# represents a state of a signal line for notifying the multi-function device 2 (the bridge-circuit part 2a) of the completion of preparation for exchanging data with the PCI device 15 from which the address data (instruction) is input. Additionally, DEVSEL# represents a state of a signal line which notifies the PCI device 15 of the result of selection of one of the first and second card-bus devices D-1 and D-2 corresponding to the address data (instruction). If the data to be transferred to the PCI device 15 through the PCI bus 11 has not been prepared when the result of selection of the first and second card-bus devices D-1 and D-2 is notified, a signal line TRDY# is at a high level and a signal line STOP# is at a low level.

When the address data (A1) which relates to the first card-bus device D-1 is input for the first time through the PCI bus 11, the data to be transferred to the PCI device 15 is not prepared. Thereby, the signal line TRDY# is at the high level and the signal line STOP# is at the low level. At this time, preparation for the data (D1) to be transferred to the PCI device 15 is started. The preparation for the data (D1) by the first card-bus device D-1 is managed by the state-machine part s-1. In this state, if address data (A2) which is related to the second card-bus device D-2 is input through the PCI bus 11, the address data (A2) can be accepted since the operation of the state-machine part s-2 is separately performed from the state-machine part s-1. When the address data (A2) is input for the first time, the signal line TRDY# is at the high level and the signal line STOP# is at the low level since data (D2) for the address data (A2) has not been prepared yet. However, the address data (A2) is accepted by the state-machine part s-2, and, thereby, preparation for the data (D2) by the second card-bus device D-2 is started. Thereafter, if the address data (A1) is input for the second time after the preparation of the data (D1) by the first card-bus device D-1 is completed, the signal line TRDY# is changed to the low level and the signal line STOP# is maintained at the high level. Thus, the data (D1) is sent to the PCI bus 11.

As mentioned above, since the state-machine parts s-1 and s-2, each of which can be separately operated, are provided in the multi-function device 2, the PCI bus 11 is prevented from being occupied by one of the first and second card-bus devices D-1 and D-2, which results in data transfer being efficiently performed.

In the above-mentioned embodiment, the PCI bus and the card bus are bridged. However, the present invention is not limited to this structure, and the PCI bus and another PCI bus may be connected by the bridge-circuit part according to the present invention. Additionally, the bridge-circuit part according to the present invention may connect between a card bus and another card bus, or a PCI bus and an Industry Standard Architecture (ISA) bus. It should be noted that a PCI—PCI bridge circuit may be used for increasing the number of LSIs connected to the PCI bus or increasing the number of expansion slots.

Additionally, there may be another structure of the present invention in which a first PCI bus is connected to a second PCI bus and other buses via a first bridge circuit of the multi-function device according to the present invention, and the second PCI bus is connected to an ISA bus and other buses via a second bridge circuit of the multi-function device according to the present invention. In such a structure, at least one of function parts may correspond to a multi-function device according to the present invention. That is, the at least one of the function parts may comprise a plurality of function parts and respective state-machine parts.

The present invention is not limited to the specifically disclosed embodiments, and variations and modifications may be made without departing from the scope of the present invention.

The present application is based on Japanese priority application No.10-124497 filed on May 7, 1998, the entire contents of which are hereby incorporated by reference.

What is claimed is:

1. A multi-function device adapted to be connected to a first bus, said multi-function device comprising:

a plurality of function parts each of which provides a different function with respect to a signal input through the first bus; and a plurality of state-machine parts connected to, and adapted to manage operations of, respective ones of the function parts, wherein each of said state-machine parts is operable independently of the other state-machine parts, such that the function parts managed by the respective state-machine parts can be operated simultaneously, and wherein each state-machine part detects whether an instruction provided on the first bus is provided for the respective function part to which it is connected.

2. The multi-function device according to claim 1, wherein the multi-function device includes a PC card.

3. A bridge circuit for interconnecting a first bus to a plurality of others buses, comprising:

a plurality of state machine parts, each state machine part being coupled to a corresponding function part through a corresponding one of the other buses, and managing the corresponding function part; and a master block, wherein the master block sends a signal from one of the function parts to the first bus, wherein each of said state-machine parts is operable independently of the other state-machine parts, such that the function parts managed by the respective state-machine parts can be operated simultaneously, wherein each state-machine part detects whether an instruction provided on the first bus is provided for the respective function part to which it is connected.

4. The bridge circuit according to claim 3, wherein the bridge circuit connects a PCI bus and a card bus.

5. The bridge circuit according to claim 3, wherein the bridge circuit connects two or more PCI buses.

6. The bridge circuit according to 3, wherein the bridge circuit connects a PCI bus and an ISA bus.

* * * * *